(12) United States Patent
Quinn et al.

(10) Patent No.: US 11,003,585 B2
(45) Date of Patent: May 11, 2021

(54) DETERMINING AFFINITY DOMAIN INFORMATION BASED ON VIRTUAL MEMORY ADDRESS

(71) Applicant: International Business Machines Corporation, Armonk, NY (US)

(72) Inventors: William F. Quinn, Austin, TX (US); Anil Kalavakolanu, Austin, TX (US); Douglas Griffith, Burnet, TX (US); Sreenivas Makineedi, Round Rock, TX (US); Mathew Accapadi, Cedar Park, TX (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 39 days.

(21) Appl. No.: 16/295,584

(22) Filed: Mar. 7, 2019

(65) Prior Publication Data
US 2020/0285588 A1    Sep. 10, 2020

(51) Int. Cl.
| | |
|---|---|
| *G06F 12/1009* | (2016.01) |
| *G06F 9/455* | (2018.01) |
| *G06F 9/54* | (2006.01) |
| *G06F 9/50* | (2006.01) |
| *G06F 9/38* | (2018.01) |

(52) U.S. Cl.
CPC ...... *G06F 12/1009* (2013.01); *G06F 9/45541* (2013.01); *G06F 9/45558* (2013.01); *G06F 9/5033* (2013.01); *G06F 9/541* (2013.01); *G06F 9/3891* (2013.01)

(58) Field of Classification Search
CPC ............ G06F 12/1009; G06F 9/45541; G06F 9/5033; G06F 9/45558; G06F 9/541; G06F 2212/2542
See application file for complete search history.

(56) References Cited

U.S. PATENT DOCUMENTS

| | | |
|---|---|---|
| 7,444,636 B2 | 10/2008 | Noel et al. |
| 9,904,473 B2 | 2/2018 | Kumar et al. |
| 9,983,642 B2 | 5/2018 | Hedge et al. |

(Continued)

OTHER PUBLICATIONS

Rose-Hulman, "Virtual Memory—Virtual to physical address translation," 2002, 36 pgs.

(Continued)

*Primary Examiner* — Michelle T Bechtold
(74) *Attorney, Agent, or Firm* — Cantor Colburn LLP; David Quinn

(57) ABSTRACT

A method for determining affinity domain information based on virtual memory address in a computing system where access to memory is non-uniform includes receiving a request to identify an affinity domain associated with a specified virtual memory address. The affinity domain includes a cluster of processors and memory local to the cluster of processors. A physical memory page corresponding to the specified virtual memory address is determined using a page table mapping a plurality of virtual memory addresses to a plurality of physical addresses. An affinity domain associated with the determined physical memory page is identified. Affinity domain information is provided for the identified affinity domain.

17 Claims, 6 Drawing Sheets

(56) References Cited

U.S. PATENT DOCUMENTS

| | | | |
|---|---|---|---|
| 2003/0009634 A1* | 1/2003 | Arimilli | G06F 12/0817 |
| | | | 711/141 |
| 2007/0016914 A1 | 1/2007 | Yeap | |
| 2011/0238803 A1* | 9/2011 | Kern | G06F 9/5077 |
| | | | 709/223 |
| 2012/0072627 A1* | 3/2012 | Droux | G06F 9/505 |
| | | | 710/104 |
| 2016/0062802 A1 | 3/2016 | Guan et al. | |
| 2017/0228164 A1* | 8/2017 | Jayasena | G06F 12/0802 |

OTHER PUBLICATIONS

Hand, "Operating Systems II", Michaelmas Term 2005, 8 lectures for CST IB, Operating Systems II—P/L/TT/11, 124 pgs.

Authors et al.: Disclosed Anonymously, "Method for tracking association of tasks and its memory references in order to improve locality of reference in a NUMA system," An IP.com Prior Art Database Technical Disclosure, IP.com No. IPCOM000249125D, IP.com Electronic Publication Date: Feb. 8, 2017, 5 pgs.

Author Unknown, "Memory Access Audit Tool," An IP.com Prior Art Database Technical Disclosure, IP.com No. IPCOM000245764D, IP.com Electronic Publication Date: Apr. 5, 2016, 7 pgs.

Authors et al.: IBM, "Scheme for Emulating a Real Memory Area in a System with Virtual Memory," An IP.com Prior Art Database Technical Disclosure, Original Publication Date: Feb. 12, 2008, IP.com No. IPCOM000167401D, IP.com Electronic Publication Date: Feb. 12, 2008, 5 pgs.

\* cited by examiner

DETERMINING AFFINITY DOMAIN INFORMATION BASED ON VIRTUAL MEMORY ADDRESS

BACKGROUND

The present invention relates to techniques for managing memory in computing systems and, more specifically, to determining affinity domain information based on the virtual memory address.

Concerns over memory mismanagement continue to increase due to the increasing inadvertent and malicious misuse of memory in computing systems. For example, the same memory is often used by different applications or processes within an operating system instance. Additionally, in systems that employ virtualization as a tool to abstract physical resources (such as processors, memory, storage, etc.) into different logical partitions (running different operating systems), the same memory can also be used by different applications (or processes) in each logical partition. In these situations, it is often possible for a subsequent application to access or recover data within memory that was used by the previous application. This recovered data, if exploited, can comprise the security of several programs in the operating system and/or comprise sensitive customer information.

The feature of NUMA (Non Uniform Memory Access) architecture is that the shared memories are distributed physically, and the collection of all these memories is global address space. Therefore, the time that the processors spend in accessing these memories is different; apparently the speed of accessing the local memories (high affinity) is a little more than that of accessing global shared memories or remotely accessing other memories (low affinity).

As memory sizes continue to grow each year, however, determining where a particular page is located is increasingly becoming a time-consuming and hardware intensive process. Thus, there is a need for improved methods for quickly determining affinity domain information in systems that support large memory sizes.

SUMMARY

Embodiments of the present invention are directed to a computer-implemented method for determining affinity domain information based on virtual memory address in a computing system where access to memory is non-uniform. A non-limiting example of the computer-implemented method includes receiving a request to identify an affinity domain associated with a specified virtual memory address. The affinity domain includes a cluster of processors and memory local to the cluster of processors. A physical memory page corresponding to the specified virtual memory address is determined using a page table mapping a plurality of virtual memory addresses to a plurality of physical addresses. An affinity domain associated with the determined physical memory page is identified. Affinity domain information is provided for the identified affinity domain.

Embodiments of the present invention are directed to a system for determining affinity domain information based on virtual memory address in a computing system where access to memory is non-uniform. A non-limiting example of the system includes a memory having computer-readable instructions and one or more processors for executing the computer-readable instructions. The computer-readable instructions include instructions to receive a request to identify an affinity domain associated with a specified virtual memory address. The affinity domain includes a cluster of processors and memory local to the cluster of processors. A physical memory page corresponding to the specified virtual memory address is determined using a page table mapping a plurality of virtual memory addresses to a plurality of physical addresses. An affinity domain associated with the determined physical memory page is identified. Affinity domain information is provided for the identified affinity domain.

Embodiments of the invention are directed to a computer-program product for determining affinity domain information based on virtual memory address in a computing system where access to memory is non-uniform, the computer-program product including a computer-readable storage medium having program instructions embodied therewith. The program instructions are executable by a processor to cause the processor to perform a method. A non-limiting example of the method includes receiving a request to identify an affinity domain associated with a specified virtual memory address. The affinity domain includes a cluster of processors and memory local to the cluster of processors. A physical memory page corresponding to the specified virtual memory address is determined using a page table mapping a plurality of virtual memory addresses to a plurality of physical addresses. An affinity domain associated with the determined physical memory page is identified. Affinity domain information is provided for the identified affinity domain.

Additional technical features and benefits are realized through the techniques of the present invention. Embodiments and aspects of the invention are described in detail herein and are considered a part of the claimed subject matter. For a better understanding, refer to the detailed description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

Figure 1:
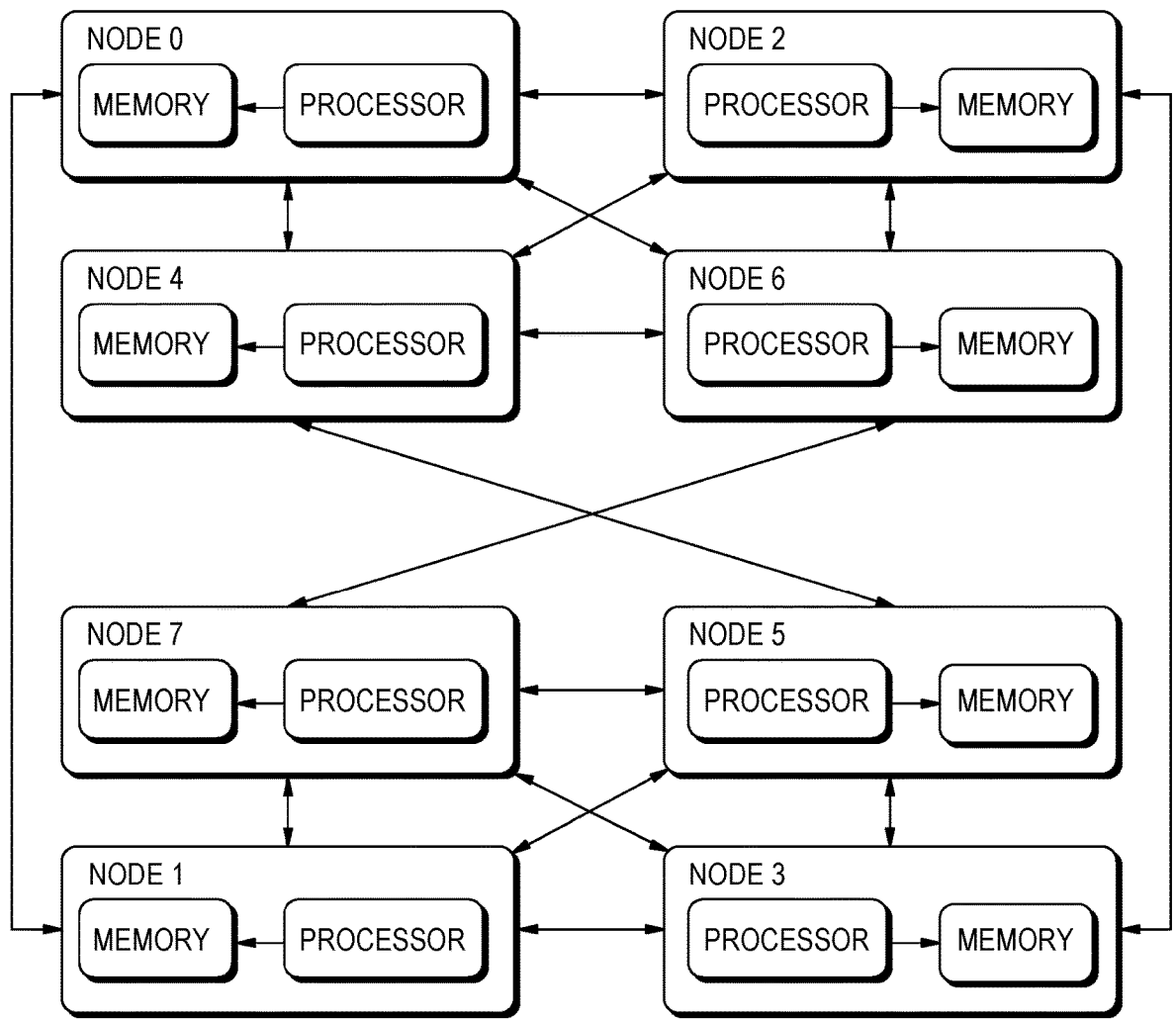
FIG. 1 is a schematic NUMA architecture, according to an embodiment of the invention.

The diagrams depicted herein are illustrative. There can be many variations to the diagram or the operations described therein without departing from the spirit of the invention. For instance, the actions can be performed in a differing order or actions can be added, deleted or modified. Also, the term "coupled" and variations thereof describes having a communications path between two elements and does not imply a direct connection between the elements with no intervening elements/connections between them. All of these variations are considered a part of the specification.

In the accompanying figures and following detailed description of the disclosed embodiments, the various elements illustrated in the figures are provided with two- or three-digit reference numbers. With minor exceptions, the leftmost digit(s) of each reference number correspond to the figure in which its element is first illustrated.

DETAILED DESCRIPTION

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" may be understood to include any integer number greater than or equal to one, i.e., one, two, three, four, etc. The terms "a plurality" may be understood to include any integer number greater than or equal to two, i.e., two, three, four, five, etc. The term "connection" may include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

As noted above, as memory sizes continue to grow each year, determining where a particular page is located is increasingly becoming a time-consuming and hardware intensive process. Turning now to an overview of technologies that are more specifically relevant to aspects of the invention, embodiments of the present invention provide a method for determining affinity domain information based on virtual memory address in a computing system where access to memory is non-uniform. In one exemplary implementation, the computing system may be divided into distinct logical or virtual partitions and special infrastructure partitions may be implemented to control resource management and to control physical I/O device drivers that are, in turn, used by operating systems in other distinct logical or virtual guest partitions. Operating systems in various logical or virtual partitions may communicate with the I/O partitions via memory channels. Yet another exemplary embodiment relates to computer system para-virtualization using a hypervisor that is implemented in a distinct logical or virtual partition of the computing system so as to manage multiple operating systems running in other distinct logical or virtual partitions of the computing system. Generally, various embodiments of the present invention disclose techniques to quickly and efficiently translate an operating system virtual memory address to the physical page in hardware and to obtain affinity domain information using a minimal number of Central Processing Unit (CPU) cycles.

Another environment where embodiments of the present invention could be implemented may be a data center which may include a collection of virtual machines (VMs), each specialized to run one service per VM, wherein the number of VMs dedicated to each service may be configurable. Such a data center may include an application server. The application server may comprise, for example, a VM with multiple available services (e.g., mail, Web, SQL, and file sharing). According to embodiments of the present invention, such an application server may include efficient hardware and/or VM layer that translates a virtual memory address to the physical page and that determines affinity domain information. In yet another embodiment, the application server may include a kernel service that performs the translation and affinity domain determination.

When affinity domains are formed and once information about affinity domain associated with a particular virtual memory address is obtained, the application server may build memory management structures for the shared memory owned by the different affinity domains. In yet another embodiment, certain dedicated CPU instructions may directly invoke the affinity domain management facility. Generally, once the affinity domain information is obtained, it may be used to manage memory in and between affinity domains where memory is local to the running CPU.

While some embodiments will be described in the general context of program modules that execute in conjunction with an application program that runs on an operating system on a personal computer, those skilled in the art will recognize that aspects may also be implemented in combination with other program modules.

Generally, program modules include routines, programs, components, data structures, and other types of structures that perform particular tasks or implement particular abstract data types. Moreover, those skilled in the art will appreciate that embodiments may be practiced with other computer system configurations, including hand-held devices, multiprocessor systems, microprocessor-based or programmable consumer electronics, minicomputers, mainframe computers, and comparable computing devices. Embodiments may also be practiced in distributed computing environments where tasks are performed by remote processing devices that are linked through a communications network. In a distributed computing environment, program modules may be located in both local and remote memory storage devices.

Throughout this specification, the term "platform" may be a combination of software and hardware components to provide a method for determining affinity domain information based on virtual memory address in a computing system where access to memory is non-uniform. Examples of platforms include, but are not limited to, a hosted service executed over a plurality of servers, an application executed on a single computing device, and comparable systems. The term "server" generally refers to a computing device executing one or more software programs typically in a networked environment. More detail on these technologies and example operations is provided below.

A computing device, as used herein, refers to a device comprising at least a memory and a processor that includes a desktop computer, a laptop computer, a tablet computer, a smartphone, a vehicle mount computer, or a wearable computer. A memory may be a removable or non-removable component of a computing device configured to store one or more instructions to be executed by one or more processors. A processor may be a component of a computing device coupled to a memory and configured to execute programs in conjunction with instructions stored by the memory. A file is any form of structured data that is associated with audio, video, or similar content. An operating system is a system configured to manage hardware and software components of a computing device that provides common services and applications. An integrated module is a component of an application or service that is integrated within the application or service such that the application or service is configured to execute the component. A computer-readable memory device is a physical computer-readable storage medium implemented via one or more of a volatile computer memory, a non-volatile memory, a hard drive, a flash drive, a floppy disk, or a compact disk, and comparable hardware media that includes instructions thereon to automatically save content to a location. A user experience—a visual display associated with an application or service through which a user interacts with the application or service. A user action refers to an interaction between a user and a user experience of an application or a user experience provided by a service that includes one of touch input, gesture input, voice command, eye tracking, gyroscopic input, pen input, mouse input, and keyboards input. An application programming interface (API) may be a set of routines, protocols, and tools for an application or service that enable the application or service to interact or communicate with one or more other applications and services managed by separate entities.

FIG. 1 is a schematic diagram of NUMA architecture, according to an embodiment of the invention. In this embodiment, a computing device (e.g., an application server) is a NUMA architecture server with eight NUMA nodes. Since the distances between the processors located at different positions and each corresponding memory are different, and the distances between the various processors are also different, the time that the different processors spend in accessing a particular memory page is different as well.

Figure 2:
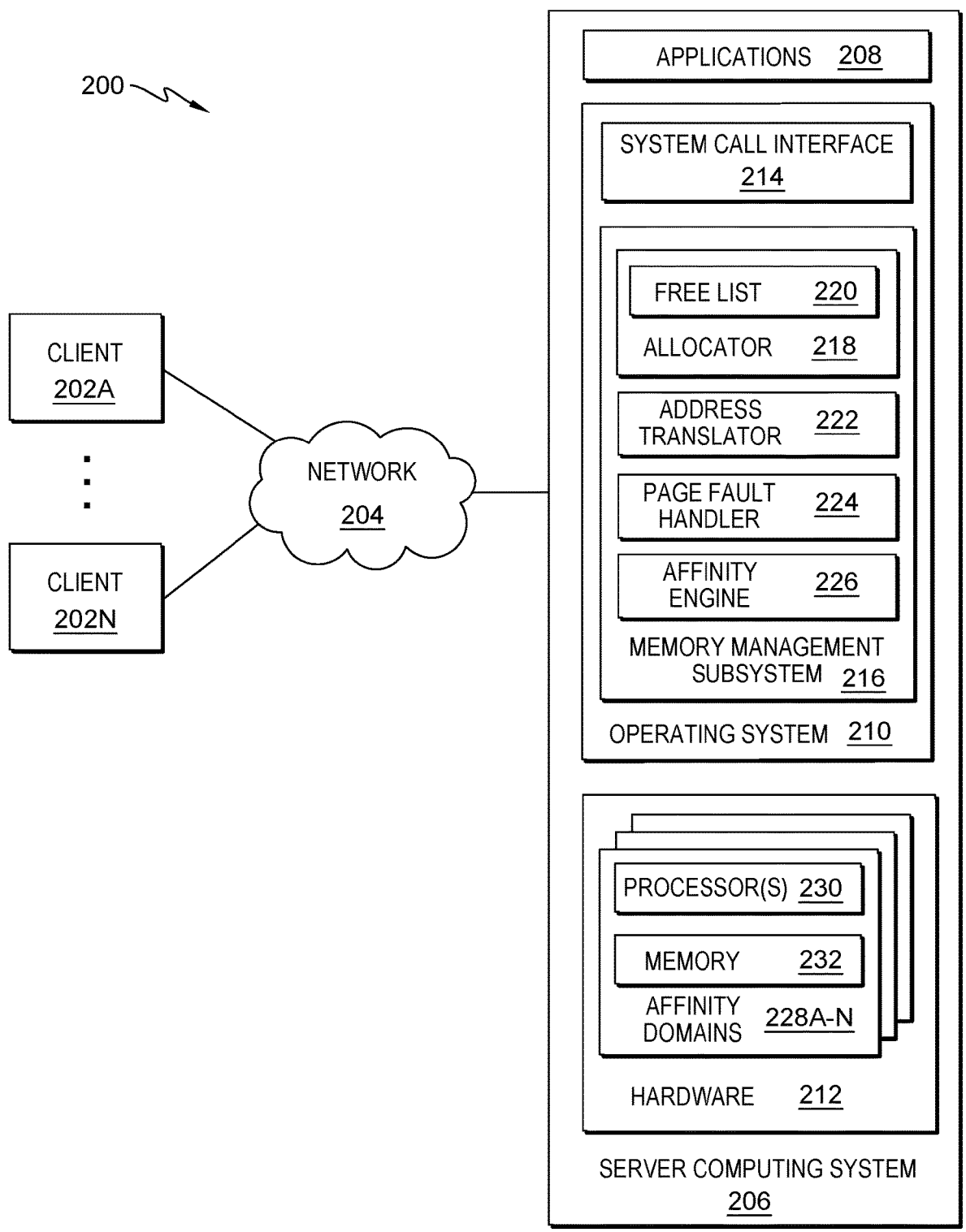
FIG. 2 illustrates an example computing environment, in accordance with embodiments of the present invention.

FIG. 2 illustrates an example computing environment 200, according to one embodiment. As shown, the computing environment 200 includes a plurality of clients 202A-N connected via the network 204 to a server computing system 206. In general, the network 204 may be a wide area network (WAN), local area network (LAN), wireless LAN (WLAN), etc. In one embodiment, each one of the clients 202A-N can be any kind of physical computing system having a network interface, such as a desktop computer, laptop computer, mobile device, tablet computer, and the like. The clients 202A-N can access (or share), via the network 204, resources hosted on one or more virtual machines within the server computing system 206.

The server computing system 206 includes a set of applications 208, an operating system 210 and hardware 212. The hardware 212 of the server computing system 206 includes processors 230 and memory 232 distributed across one or more affinity domains 228A-N. The processors 230 may represent one or more processors (e.g., microprocessors, CPUs, etc.) or multi-core processors. The memory 232 may represent random access memory (RAM) devices that include the main storage of the server computing system 206, as well as supplemental levels of memory, e.g., cache memories, non-volatile or backup memories (e.g., programmable or flash memories), read-only memories, and the like. In addition, the memory 232 may include memory storage physically located in the server computing system 206 or on another computing device coupled to the server computing system 206.

The server computing system 206 operates under the control of the operating system 210, which is responsible for running applications 208 and managing the application(s)' 208 access to software resources and hardware resources 212. In one embodiment, the application 208 is a database application, such as an Oracle® database. The operating system 210 generally represents any operating system, with examples including versions of Microsoft® Windows®, Linux® and Unix® distributions, and so on.

As shown, the operating system 210 includes a system call interface 214 and a memory management subsystem 216. In one embodiment, the system call interface 214 and memory management subsystem 216 are located in the kernel of the operating system 210. The application(s) 208 can request services (e.g., make system calls) from the operating system 210 via the system call interface 214. The request for services can include resource requests for one or more processes, requests for the creation and execution of new processes, requests for access to various hardware devices (e.g., certain peripheral devices, etc.), requests for communication services, and others. For example, in one embodiment, the application(s) 208 can request, via the system call interface 214, that the operating system 210 allocate certain resources, such as memory, to one or more processes of the application(s) 208.

The memory management subsystem (MMS) (or virtual memory manager) 216 manages all requests for (physical and/or virtual) memory from the operating system 210 and applications 208. As shown, the MMS 216 includes allocator 218, address translator 222 and page fault handler 224. The MMS 216 uses the allocator 218 to allocate and/or de-allocate memory to the application processes and the kernel based on their needs. The allocator 218 maintains a list of free pages of real memory in the free list 220, from which it can allocate to the application processes.

The MMS 216 also implements virtual memory, which, in general, allows the operating system 210 to address more memory than is physically available in the server computing system 206 (e.g., by temporarily transferring pages of data from random access memory to secondary storage). To implement virtual memory, the MMS 216 relies on the address translator 222, which translates virtual addresses to physical addresses, and the page fault handler 224, which moves pages of data between physical memory and secondary storage when a page fault occurs. For example, if a process attempts to access a page of memory that is mapped to a virtual address space, but not loaded in physical memory, a page fault occurs and the page fault handler 224 attempts to page-in (or retrieve) the referenced page into physical memory. In some cases, the page fault handler 224 can attempt to resolve page faults with one of the unallocated pages maintained in the free list 220.

As also shown, the MMS 216 includes an affinity engine 226 which performs the techniques presented herein. For example, as described below, in one embodiment, the affinity engine 226 is configured to obtain affinity domain information associated with a translated physical address. For example, in one embodiment, the affinity engine 226 segregates (or sorts) the memory region into multiple sections with each section containing pages that are associated with a NUMA affinity domain. Upon receiving a request to identify an affinity domain associated with a specified virtual memory address, the affinity engine 226 asks the address translator 222 to translate the specified virtual address to physical address, maps the physical address to the corresponding memory page and then identifies an affinity domain associated with the determined memory page. In one embodiment, the affinity engine 226 then sends the affinity domain information back to the caller (sender of the request). In various embodiments, this functionality can be implemented as a dedicated CPU instruction, kernel service, VMM layer call, and the like. This improves memory access time, relative to traditional techniques.

Note, however, that FIG. 2 illustrates merely one possible arrangement of the computing environment 200. More generally, one of ordinary skill in the art will recognize that other embodiments of computing systems can also be configured to implement a method for determining affinity domain information in accordance with the techniques presented herein.

Figure 3:
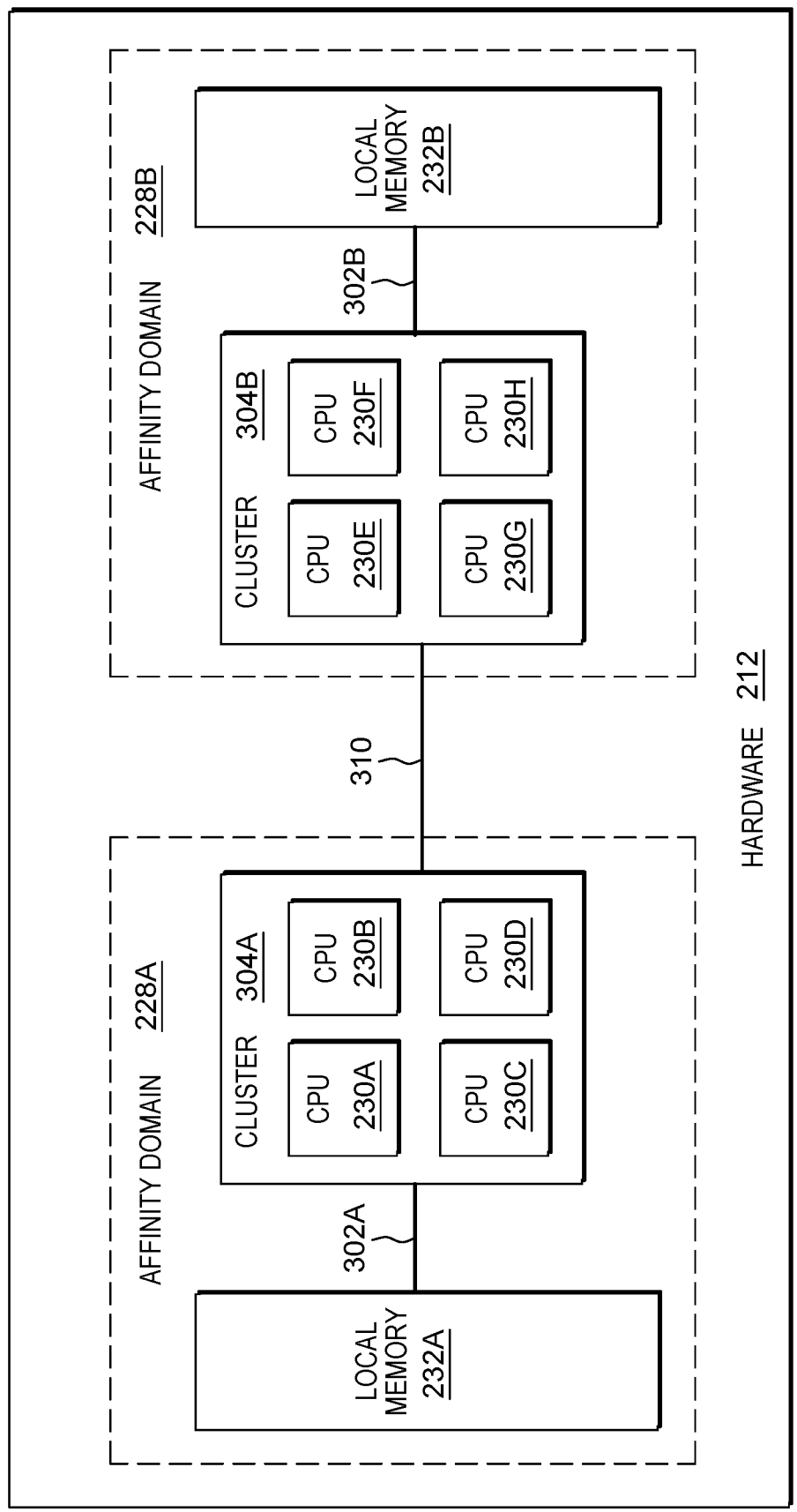
FIG. 3 illustrates an example of a hardware configuration of a computing system in which access to memory is non-uniform, in accordance with embodiments of the present invention.

FIG. 3 further illustrates an example of the hardware 212 within the server computing system 206 described relative to FIG. 2, according to one embodiment. As shown, hardware 212 includes a distribution of CPUs 230A-H and memory 232A-B across affinity (or NUMA) domains 228A-B. In particular, the depicted embodiment shows a first cluster 304A that includes CPUs 2304A-D and a second cluster 304B that includes CPUs 230E-H. The first cluster 304A is coupled to local memory 232A via a local bus 302A. Likewise, the second cluster 304B is coupled to local memory 232B via a local bus 302B. An intermediate bus 310 (also referred to as an interconnect) can be used to couple the CPUs in the cluster 304A to the CPUs in the cluster 304B.

In one embodiment, each of the cluster 304A and the cluster 304B represents a single processor chip that includes one or more processors. Moreover, although not shown, one or more memory controllers can also be integrated into (or external to) the clusters 304A and 304B. The memory controllers can be used by the CPUs in both of the clusters 304A and 304B, respectively, to access local memory 232A and 232B.

In one embodiment, the hardware 212 represents a NUMA architecture. A NUMA architecture, in general, classifies memory into affinity domains (or NUMA nodes) based on similar performance characteristics (e.g., speed, latency, contention probability, etc.) for the memory. For example, local memory 232A in affinity domain 228A may have the same access characteristics for the CPUs 230A-D in cluster 304A. Similarly, local memory 232B in affinity domain 228B may have the same access characteristics for the CPUs 230E-H in cluster 304B. For a given processor, accessing memory that is local to (or within) the same affinity domain is significantly faster than accessing memory that is remote to (or outside) the affinity domain. Further, accesses from processors to local memory also reduce (or avoid) contention on the intermediate bus 310 and the remote memory controllers. In the depicted embodiment, for example, the access time (or latency) for each of the CPUs 230A-D to local memory 232A is significantly lower than the access time for each of the CPUs 230A-D to remote memory 232B (since the CPUs 230A-D have to traverse both the intermediate bus 310 and the local bus 302B to access remote memory 232B). Likewise, the access time to local memory 232B by CPUs 230E-H is significantly lower than the access time to remote memory 232A by the CPUs 230E-H.

Note, however, that FIG. 3 illustrates merely one possible arrangement of processors 230 and memory 232 in the hardware 212. For example, although two affinity domains 228A and 228B are shown within the hardware 212, the hardware 212 could include any number of affinity domains. Further, any of the affinity domains could include different access pathways, different numbers of CPUs, clusters, etc., depending on the particular hardware configuration of a computing system.

Figure 4:
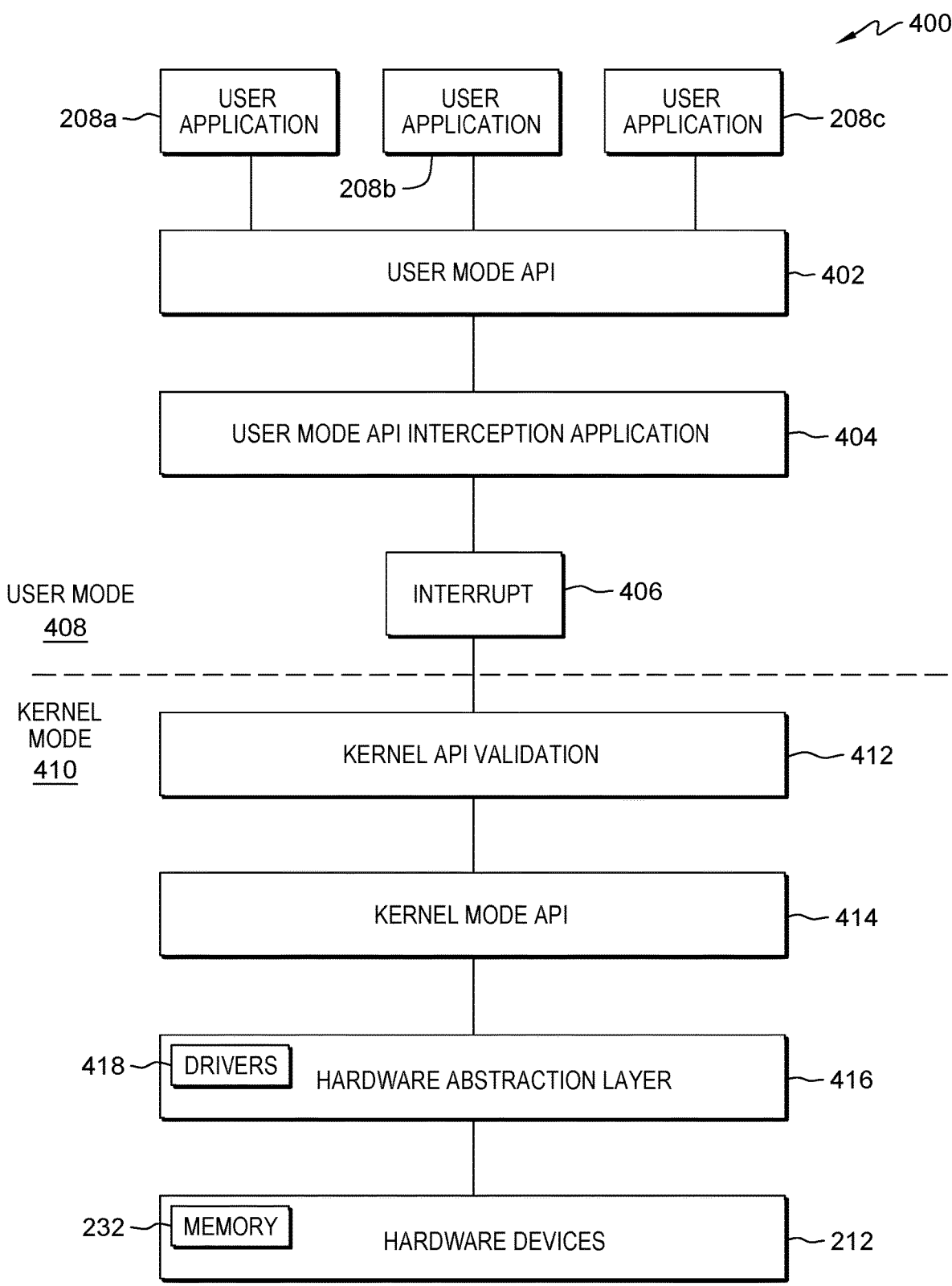
FIG. 4 is a functional block diagram of a computing system, in accordance with an alternative embodiment of the present invention.

FIG. 4 is a functional block diagram of a computing system 400, in accordance with an alternative embodiment of the present invention. In this embodiment, affinity domain information is provided as a kernel service. The computing system 400 can be divided into a user portion ("user mode") 408 and a kernel portion ("kernel mode") 410. In one implementation, the operating system 210 of the computing system 400 resides in the kernel mode 410. The user mode 408 can include, for example, user applications 208a, 208b, and 208c, which can be directly accessed or modified by a user. In contrast, the kernel mode 410 can be a secure layer of the computing system 400 that cannot be directly accessed by a user.

The user mode includes user applications 208a, 208b, and 208c, a user mode API 402, and one or more user mode API interception applications 404. The user applications 208a-208c can include applications accessible by a user for performing different functions on the computing system. For example, the user applications 208a-c can include word processing, database management, email applications, and any other user managed applications. The user applications 208a-208c can provide different functionality in response to user input. For example, in a word processing application, a user can open a file, create a new file, and save a file in response to user input.

To provide the requested functions, the user applications 208a-c can generate one or more different system calls which can be transmitted to the user mode API 402. In one embodiment, such system calls may include a call to identify an affinity domain associated with a particular virtual memory address. Some other examples of system calls include calls to open a file, create a process, load a library, terminate a process, open a registry key, and perform other functions. For example, the user of a word processing program can request the user application 208 to provide (e.g., open) a particular saved file. The user application 208 can transmit an open file call to the user mode API 402 in response to the user request. If the user application 208 manages shared memory itself, it can transmit a call to identify an affinity domain to the user mode API 402, for example.

The user mode API 402 is an interface through which the user applications 208*a-c* can access the operating system and other kernel mode 410 resources of the computing system 400. In one implementation, the user mode API 402 includes a number of different libraries (e.g. .dll files) which can be used to initially process a call received from a particular user application 208 (e.g., an open file call). In another implementation, some of the calls to the user mode API 402 can be completed in user mode 408 without resources from the kernel mode 410. For example, some functions can access information within the user mode 408 such as a "get current process" function that retrieves an identifier of a calling process without accessing the kernel mode 410.

Other calls to the user mode API 402, may require other (e.g., kernel) resources in order to provide the user requested function. In one implementation, the user mode API 402 is not allowed to directly access the kernel of the operating system. An interrupt 406 can be associated with the user mode API 402 and used to access higher security process levels. Thus, in one implementation the user mode API 402 can act as a gateway to the kernel mode API 414 allowing the functionality of the kernel mode 410 to be isolated from the user mode 408 such that all calls to the kernel mode 410 require an interrupt triggered by the user mode API 402.

For example, when a user application 208 sends an "identify an affinity domain" call to the user mode API 402, the call initially points to one or more libraries where the user mode API 402 can perform some initial processing associated with the received request. In one implementation, because the received request/call requires one or more system resources (e.g., kernel mode 410 resources) an interrupt 406 can be generated. The interrupt 406 can include instructions (e.g., a system call such as "SYSCALL") to access a privileged kernel function. Thus, the interrupt 406 allows the call to transfer from the user mode API 402 to the kernel mode 410. After switching into the kernel mode 410, the accessed kernel function can look up the correct pointer (e.g., using a service table) and call a corresponding function associated with the kernel mode API 414 for executing the identify an affinity domain call. The kernel mode 410 call can then perform the work to find requested information and return the information (e.g., affinity domain information) back to the user application 208 making the initial call (via user mode API 402).

User mode API interception applications 404 can include one or more different interception applications used to provide additional functionality to the computing system 400. For example, API interception applications 404 can include functionality to provide operating system lockdown, behavior analysis, data encryption, access cataloging, profiling and other services. In one implementation, the API interception applications 404 can monitor calls into or from the user mode API 402. In one implementation, the API interception application 404 intercepts system calls leaving the user mode API 402. The API interception application 404 can then intercept all user mode call threads directed to the kernel mode API 414.

The kernel mode 410 includes a kernel API validation layer 412, a kernel mode API 414, a hardware abstraction layer 416, and hardware devices 212. The hardware devices 212 can include the physical devices for operating the computer system 400. As noted above, the hardware devices 212 can include storage devices such as memory 232, affinity domains 228A-N (shown in FIG. 2), processing devices, and other input/output devices.

The hardware abstraction layer 416 allows different software to be device-independent by abstracting information from systems such as caches, I/O buses, and interrupts and using hardware data to provide applications 208 a way to interact with the specific requirements of the hardware devices 212 on which the application 208 or portion thereof is running/interacting, etc. In one implementation, the hardware abstraction layer 416 includes drivers 418 that can be used to control the hardware devices by providing access to registers of hardware devices.

The kernel mode API 414 is a part of the operating system 210 of the computing system 400 operating in kernel mode 410. In one implementation, the kernel mode API 414 is a secure API capable of accessing different kernel resources, for example, kernel objects such as mutex, semaphore, or the memory system. The kernel mode API 414 is accessed through an interrupt 406 generated from the user mode API 402. The interrupt 406 transfers control to a set of privilege instructions providing access to the kernel mode 410. An interrupt 406 providing access to the kernel mode 410 can include a system call instruction, a trap gate, an interrupt gate, and a call gate. In one implementation, the user mode API 402 calls into the kernel mode API 414 by identifying a kernel mode call corresponding to the received user mode API call.

The kernel API validation layer 412 lies in the kernel mode 410 between the user mode API 402 and the kernel mode API 414. In one implementation, the kernel API validation layer 412 intercepts each incoming call from the user mode 408 into the kernel mode API 414. The kernel API validation layer 412 can intercept each call into the kernel mode API 414 in order to verify that the calls are legitimate.

Figure 5:
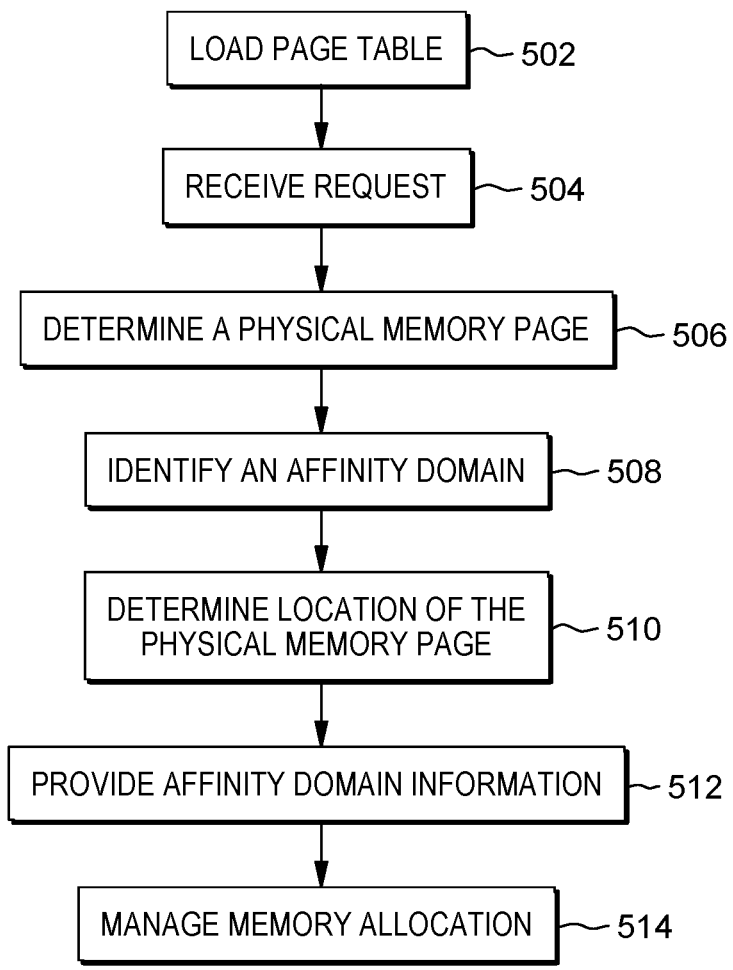
FIG. 5 shows a flow diagram of a method for determining affinity domain information based on virtual memory address in a computing system where access to memory is non-uniform, in accordance with embodiments of the present invention.

FIG. 5 shows a flow diagram of a method for determining affinity domain information based on virtual memory address in a computing system where access to memory is non-uniform, in accordance with embodiments of the present invention. At block 502, a page table and/or a page directory used by the operating system 210 is loaded into memory. In an embodiment where the computing system 206 implements virtualization, the page table may be used by one or more guest operating systems. In one embodiment, the page table is utilized by the address translator 222.

At block 504, the affinity engine 226 receives a request to identify an affinity domain associated with a specified virtual memory address within a global memory address space. In an embodiment, the received request may include a range of virtual addresses. The affinity engine is configured to determine if the virtual address or the range of virtual addresses map to a physical memory page or range of pages, respectively, in the global memory address space that are local to the processor making the request (call) received at block 504.

At block 506, the address translator 222 determines a physical memory page corresponding to the specified virtual address, using a page table mapping a plurality of virtual memory addresses to a plurality of physical addresses. As noted above various resources may be hosted on one or more VMs within the server computing system 206. Each VM will typically mimic the general structure of a physical computer and as such will usually have both virtual system hardware and guest system software. The virtual system hardware typically includes at least one virtual CPU, virtual memory, at least one virtual disk, and one or more virtual devices. Note that a storage disk—virtual or physical—is also a "device," but is usually considered separately because of the important role it plays. All of the virtual hardware components of the VM may be implemented in software to emulate corresponding physical components. The guest system software includes a guest OS and drivers, as needed, for example, for the various virtual devices. In such implementation, the translation performed by the address translator 222 at block 506 may involve mapping of the virtual address to a guest physical memory location first, which is mapped to a host physical memory location (page). Furthermore, in this embodiment, the call received at block 504 may be implemented as a VM layer call. The memory management subsystem 216 can facilitate making affinity domain information available to the user mode space 408 in the fewest possible CPU cycles.

At block 508, the affinity engine 226 is configured to perform a search of affinity domain memory classification, wherein the search is configured to more efficiently and accurately identify an affinity domain associated with the physical memory page determined by the address translator 22 at block 506. Optionally, in an embodiment of the present invention, the affinity engine 226 may also retrieve desired affinity domain information. The retrieved information preferably facilitates the evaluation of the current memory affinity configuration. Depending on various details of hardware components 212 of the server computing system 206, the request to identify an affinity domain associated with a specified virtual memory address may be implemented as a new dedicated hardware instruction included into an instruction set for the server computing system 206. In such an embodiment, the affinity engine 226 may be a hardware module configured to perform processing of such hardware instruction.

In an alternative embodiment, the server computing system 206 may use hypervisor virtualization. The hypervisor provides a management platform that partitions the resources of the host machine into the set of virtual or guest machines that can operate independently within the server computing system 206. In this embodiment, the request to identify an affinity domain may be implemented as a hypervisor service and the affinity engine 226 may be included in a set of binaries and library programs that run on a given virtual machine. Like a physical machine, the virtual machine has associated state information, can be backed up or restored, and may be assigned dedicated system resources. The starting up and tearing down of a virtual machine in a hypervisor system requires considerable overhead, and for this reason, when established, virtual machines typically persist for considerable run times.

In yet another alternative embodiment, the server computing system 206 may be implemented as a container management system, such as the Amazon ACS, Azure Container Service, Cloud Foundry Diego, CoreOS Fleet, Docker Swarm, Google Container Engine, or Mesosphere Marathon container management system, or other container management and orchestration system. The container management system and a set of shared operating system libraries provide a platform in which the set of containers may execute. For example, some low-level operating system libraries, such as those used for basic file input/output (I/O) functions, may be shared by all containers through the operating system kernel or container management system rather than resident in individual container. In this embodiment, the affinity engine 226 may be included in such low-level operating system libraries and the request to identify an affinity domain may be implemented as a kernel API call callable by applications 208 via the user mode API 402, for example.

According to an embodiment of the present invention, at block 510, the affinity engine 226 determines the location of the page of physical memory associated with the specified virtual address. According to embodiments of the present invention, memory management services may further classify physical memory into three categories: local, near and far. As used herein, "local memory" in a multi-node system refers to memory on the same chip. For example, referring to FIG. 3 now, memory 232A is local to each of the processors 230A-230D. As used herein, "near memory" in a multi-node system refers to memory on the same node, but local to another chip. Still referring to FIG. 3, memory 232B is near memory to each of the processors 230A-230D. It is noted that clusters 304A and 304B are positioned on different chips but on the same node. As used herein, "far memory" in a multi-node system refers to memory on a different node. For example, now referring to FIG. 1, memory on Node 4 is far memory with respect to processor(s) on any other node (e.g., Nodes 0-3 and Nodes 5-7). In other words, at block 510, the affinity engine determines whether the physical memory page corresponding to the specified virtual memory address is in a local memory, near memory or far memory.

In one embodiment, at block 512, the affinity engine 226 provides affinity domain information to the caller. In one embodiment, the affinity engine 226 may send the results to the application 208. This information should allow the caller to quickly determine where exactly the memory page associated with the specified virtual memory address is located. Again, in various embodiments, the call at block 504 can be implemented as a dedicated hardware instruction, kernel service, virtual machine or hypervisor call, and the like. At block 514, the MMS 216 may manage physical available memory 232 based on the affinity domain information provided by the affinity engine 226. In one embodiment, the allocation of physical memory can be changed dynamically, or on the fly. In an alternative embodiment, the allocation of physical memory may be managed by the caller application 208 based on the received affinity domain information.

Figure 6:
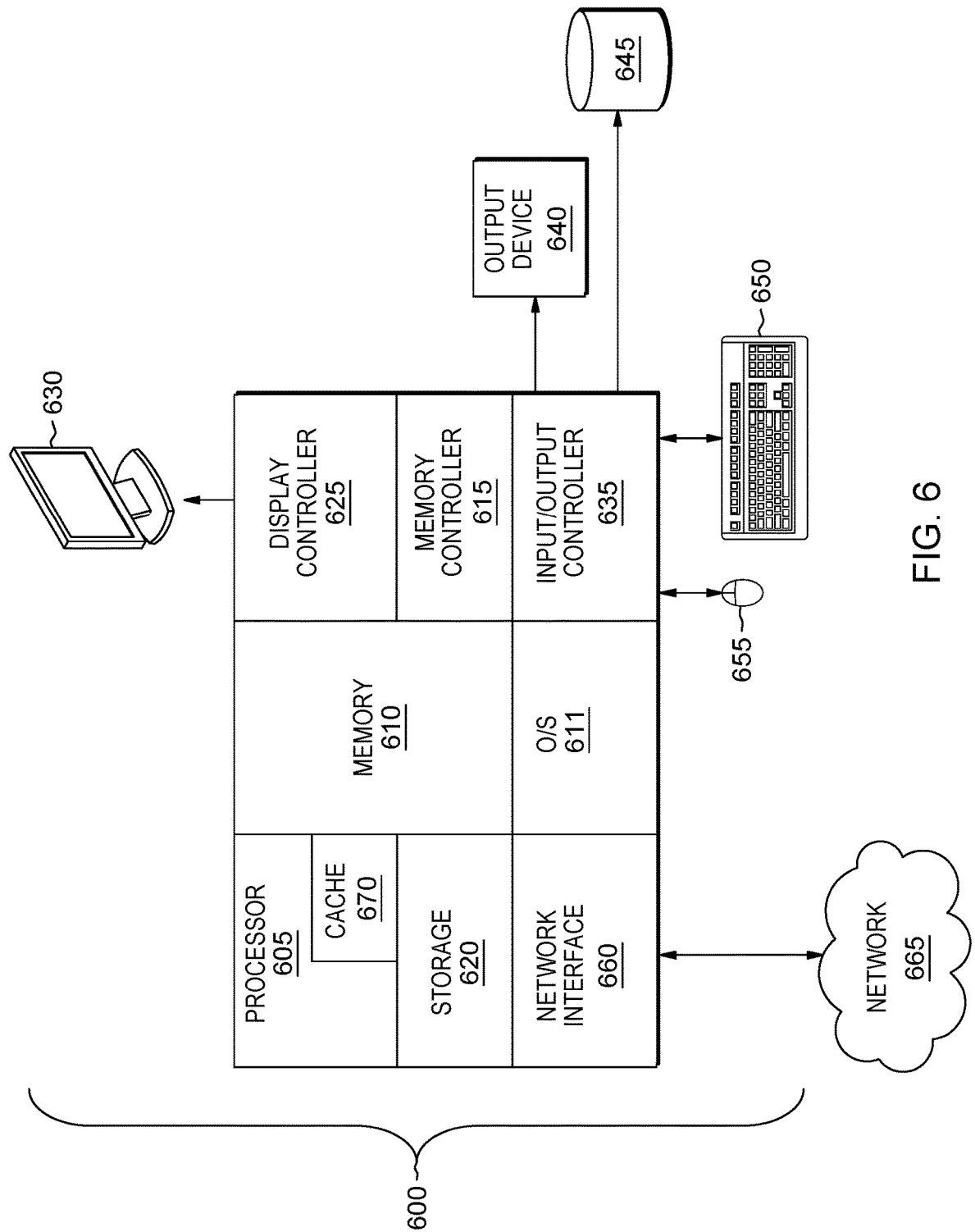
FIG. 6 is a block diagram of an example computer system for implementing some or all aspects of the method for determining affinity domain information based on the virtual memory address, in accordance with embodiments of the present invention.

FIG. 6 is a block diagram of a computer system 600 for implementing some or all aspects of the exemplary computing environment 200, according to some embodiments of this invention. The computing environment 200 and methods described herein may be implemented in hardware, software (e.g., firmware), or a combination thereof. In some embodiments, the methods described may be implemented, at least in part, in hardware and may be part of the microprocessor of a special or general-purpose computer system 600, such as a personal computer, workstation, minicomputer, or mainframe computer. For instance, the allocator 218, the address translator 222, the page fault handler 224 and the affinity engine 226 may each be implemented as a computer system 600 or may run on a computer system 600.

In some embodiments, as shown in FIG. 6, the computer system 600 includes a processor 605, memory 610 coupled to a memory controller 615, and one or more input devices 645 and/or output devices 640, such as peripherals, that are communicatively coupled via a local I/O controller 635. These devices 640 and 645 may include, for example, a printer, a scanner, a microphone, and the like. Input devices such as a conventional keyboard 650 and mouse 655 may be coupled to the I/O controller 635. The I/O controller 635 may be, for example, one or more buses or other wired or wireless connections, as are known in the art. The I/O controller 635 may have additional elements, which are omitted for simplicity, such as controllers, buffers (caches), drivers, repeaters, and receivers, to enable communications.

The I/O devices 640, 645 may further include devices that communicate both inputs and outputs, for instance disk and tape storage, a network interface card (MC) or modulator/demodulator (for accessing other files, devices, systems, or a network), a radio frequency (RF) or other transceiver, a telephonic interface, a bridge, a router, and the like.

The processor 605 is a hardware device for executing hardware instructions or software, particularly those stored in memory 610. The processor 605 may be a custom made or commercially available processor, a central processing unit (CPU), an auxiliary processor among several processors associated with the computer system 600, a semiconductor-based microprocessor (in the form of a microchip or chip set), a macroprocessor, or other device for executing instructions. The processor 605 includes a cache 670, which may include, but is not limited to, an instruction cache to speed up executable instruction fetch, a data cache to speed up data fetch and store, and a translation lookaside buffer (TLB) used to speed up virtual-to-physical address translation for both executable instructions and data. The cache 670 may be organized as a hierarchy of more cache levels (L1, L2, etc.).

The memory 610 may include one or combinations of volatile memory elements (e.g., random access memory, RAM, such as DRAM, SRAM, SDRAM, etc.) and nonvolatile memory elements (e.g., ROM, erasable programmable read only memory (EPROM), electronically erasable programmable read only memory (EEPROM), programmable read only memory (PROM), tape, compact disc read only memory (CD-ROM), disk, diskette, cartridge, cassette or the like, etc.). Moreover, the memory 610 may incorporate electronic, magnetic, optical, or other types of storage media. Note that the memory 610 may have a distributed architecture, where various components are situated remote from one another but may be accessed by the processor 605.

The instructions in memory 610 may include one or more separate programs, each of which comprises an ordered listing of executable instructions for implementing logical functions. In the example of FIG. 6, the instructions in the memory 610 include a suitable operating system (OS) 611. The operating system 611 essentially may control the execution of other computer programs and provides scheduling, input-output control, file and data management, memory management, and communication control and related services.

Additional data, including, for example, instructions for the processor 605 or other retrievable information, may be stored in storage 620, which may be a storage device such as a hard disk drive or solid-state drive. The stored instructions in memory 610 or in storage 620 may include those enabling the processor to execute one or more aspects of the affinity engine 226 and methods of this disclosure.

The computer system 600 may further include a display controller 625 coupled to a display 630. In some embodiments, the computer system 600 may further include a network interface 660 for coupling to a network 665. The network 665 may be an IP-based network for communication between the computer system 600 and an external server, client and the like via a broadband connection. The network 665 transmits and receives data between the computer system 600 and external systems. In some embodiments, the network 665 may be a managed IP network administered by a service provider. The network 665 may be implemented in a wireless fashion, e.g., using wireless protocols and technologies, such as WiFi, WiMax, etc. The network 665 may also be a packet-switched network such as a local area network, wide area network, metropolitan area network, the Internet, or other similar type of network environment. The network 665 may be a fixed wireless network, a wireless local area network (LAN), a wireless wide area network (WAN) a personal area network (PAN), a virtual private network (VPN), intranet or other suitable network system and may include equipment for receiving and transmitting signals.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instruction by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special-purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special-purpose hardware-based systems that perform the specified functions or acts or carry out combinations of special-purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

What is claimed is:

1. A method for determining affinity domain information based on a virtual memory address in a computing system where access to memory is non-uniform, the method comprising:

receiving, from a requesting processor, a request to identify an affinity domain associated with a specified virtual memory address, wherein the affinity domain comprises a cluster of processors and memory local to the cluster of processors;

determining a physical memory page corresponding to the specified virtual memory address using a page table mapping a plurality of virtual memory addresses to a plurality of physical addresses;

determining whether the physical memory page corresponding to the specified virtual memory address is in a local memory, a near memory or a far memory of the requesting processor, wherein the local memory if memory on a same chip as the requesting processor, the near memory is memory on a same node as the requesting processor but local to a different chip than the requesting processor, and the far memory is memory on a different node than the requesting processor;

identifying an affinity domain associated with the determined physical memory page; and providing affinity domain information for the identified affinity domain, wherein the affinity domain information includes whether the physical memory page corresponding to the specified virtual memory address is in the local memory, the near memory or the far memory of the requesting processor.

2. The method of claim 1, wherein the received request comprises a dedicated hardware instruction included into an instruction set for the computing system.

3. The method of claim 1, wherein the received request comprises a virtual machine (VM) layer call and wherein the VM layer executes directly on a hardware layer associated with one or more clusters of processors.

4. The method of claim 1, wherein the received request comprises a kernel application program interface (API) call.

5. The method of claim 1, wherein the received request specifies a range of virtual memory addresses.

6. The method of claim 1, further comprising managing memory allocation based on the provided affinity domain information.

7. A system for determining affinity domain information based on a virtual memory address in a computing system where access to memory is non-uniform, the system comprising:

a memory having computer-readable instructions; and
one or more processors for executing the computer-readable instructions, the computer-readable instructions comprising:
   instructions to receive a request, from a requesting processor, to identify an affinity domain associated with a specified virtual memory address, wherein the affinity domain comprises a cluster of processors and memory local to the cluster of processors;
   instructions to determine a physical memory page corresponding to the specified virtual memory address using a page table mapping a plurality of virtual memory addresses to a plurality of physical addresses;
   instructions to determine whether the physical memory page corresponding to the specified virtual memory address is in a local memory, a near memory or a far memory of the requesting processor, wherein the local memory is memory on a same chip as the requesting processor, the near memory is memory on a same node as the requesting processor but local to a different chip than the requesting processor, and the far memory is memory on a different node than the requesting processor;
   instructions to identify an affinity domain associated with the determined physical memory page; and
   instructions to provide affinity domain information for the identified affinity domain, wherein the affinity domain information includes whether the physical memory page corresponding to the specified virtual memory address is in the local memory, the near memory or the far memory of the requesting processor.

8. The system of claim 7, wherein the received request comprises a dedicated hardware instruction included into an instruction set for the computing system.

9. The system of claim 7, wherein the received request comprises a virtual machine (VM) layer call and wherein the VM layer executes directly on a hardware layer associated with one or more clusters of processors.

10. The system of claim 7, wherein the received request comprises a kernel application program interface (API) call.

11. The system of claim 7, wherein the received request specifies a range of virtual memory addresses.

12. The system of claim 7, the computer-readable instructions further comprising instructions to manage memory allocation based on the provided affinity domain information.

13. A computer-program product for determining affinity domain information based on a virtual memory address in a computing system where access to memory is non-uniform, the computer-program product comprising a non-transitory computer-readable storage medium having program instructions embodied therewith, the program instructions executable by a processor to cause the processor to perform a method comprising:
   receiving, from a requesting processor, a request to identify an affinity domain associated with a specified virtual memory address, wherein the affinity domain comprises a cluster of processors and memory local to the cluster of processors;
   determining a physical memory page corresponding to the specified virtual memory address using a page table mapping a plurality of virtual memory addresses to a plurality of physical addresses;
   determining whether the physical memory page corresponding to the specified virtual memory address is in a local memory, a near memory or a far memory of the requesting processor, wherein the local memory is memory on a same chip as the requesting processor, the near memory is memory on a same node as the requesting processor but local to a different chip than the requesting processor, and the far memory is memory on a different node than the requesting processor;
   identifying an affinity domain associated with the determined physical memory page; and
   providing affinity domain information for the identified affinity domain, wherein the affinity domain information includes whether the physical memory page corresponding to the specified virtual memory address is in the local memory, the near memory or the far memory of the requesting processor.

14. The computer-program product of claim 13, wherein the received request comprises a dedicated hardware instruction included into an instruction set for the computing system.

15. The computer-program product of claim 13, wherein the received request comprises a virtual machine (VM) layer call and wherein the VM layer executes directly on a hardware layer associated with one or more clusters of processors.

16. The computer-program product of claim 13, wherein the received request comprises a kernel application program interface (API) call.

17. The computer-program product of claim 13, wherein the received request specifies a range of virtual memory addresses.

* * * * *